(12) United States Patent
Gessner et al.

(10) Patent No.: US 8,369,872 B2
(45) Date of Patent: Feb. 5, 2013

(54) METHOD AND DEVICE FOR DETERMINATION OF THE POSITION OF A TERMINAL IN A MOBILE COMMUNICATION NETWORK

(75) Inventors: Christina Gessner, Munich (DE); Alexander Pabst, Taufkirchen (DE); Karsten Mohr, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 358 days.

(21) Appl. No.: 12/515,631

(22) PCT Filed: Oct. 19, 2007

(86) PCT No.: PCT/EP2007/009107
§ 371 (c)(1),
(2), (4) Date: May 20, 2009

(87) PCT Pub. No.: WO2008/064745
PCT Pub. Date: Jun. 5, 2008

(65) Prior Publication Data
US 2010/0056180 A1    Mar. 4, 2010

(30) Foreign Application Priority Data

Nov. 29, 2006  (DE) .......................... 10 2006 056 338

(51) Int. Cl.
*H04W 24/00*  (2009.01)
(52) U.S. Cl. ................ 455/456.2; 455/456.1; 455/456.3; 455/404.2
(58) Field of Classification Search ................ 455/456.1, 455/456.2, 456.3, 404.2
See application file for complete search history.

(56) References Cited

U.S. PATENT DOCUMENTS 6,282,427 B1 * 8/2001 Larsson et al. ............. 455/456.2
(Continued)

FOREIGN PATENT DOCUMENTS

CN   1688892 A    10/2005
DE   10222140 A1  11/2003
(Continued)

OTHER PUBLICATIONS

International Search Report, WO 2008/064745 A1, Mar. 4, 2008, pp. 21-26.
International Preliminary Report on Patentability, PCT/EP2007/009107, dated Jul. 16, 2009, pp. 1-9.

*Primary Examiner* — Rafael Pérez-Gutiérrez
*Assistant Examiner* — Liton Miah
(74) *Attorney, Agent, or Firm* — Ditthavong Mori & Steiner, P.C.

(57) ABSTRACT

A method for improved determination of the position of a user device in a mobile-radio network is provided. In combination with adjacent, second user devices, the method is intended to achieve a relatively-accurate positioning even if only a relatively-inaccurate positioning method is available for the user device itself, especially if the latter is disposed inside a building. An absolute position of a second user device is determined with a first position-determining method. A relative position of the first user device relative to the second user device is then determined with a second position-determining method. Finally, the absolute position of the first user device is determined on the basis of the absolute position of the second user device and the relative position of the first user device relative to the second user device, wherein the first and the second position-determining methods are different methods.

22 Claims, 5 Drawing Sheets

U.S. PATENT DOCUMENTS

| | | | |
|---|---|---|---|
| 6,987,976 B2 * | 1/2006 | Kohar et al. | 455/456.1 |
| 2003/0063589 A1 | 4/2003 | Haines et al. | |
| 2003/0130793 A1 | 7/2003 | Patwari et al. | |
| 2004/0082341 A1 * | 4/2004 | Stanforth | 455/456.1 |
| 2004/0110514 A1 * | 6/2004 | Kim et al. | 455/456.1 |
| 2006/0052115 A1 | 3/2006 | Khushu | |
| 2006/0059096 A1 * | 3/2006 | Dublish et al. | 705/57 |
| 2006/0232466 A1 * | 10/2006 | Park et al. | 342/357.07 |
| 2006/0268961 A1 * | 11/2006 | Prestwich et al. | 375/146 |
| 2007/0160373 A1 * | 7/2007 | Biegelsen et al. | 398/118 |

FOREIGN PATENT DOCUMENTS

| | | |
|---|---|---|
| EP | 0964265 A2 | 12/1999 |
| EP | 1229343 A1 | 8/2002 |
| GB | 2359699 A | 8/2001 |
| WO | 0247419 A1 | 6/2002 |
| WO | 03083504 A1 | 10/2003 |
| WO | WO 2004/008171 A1 | 1/2004 |

* cited by examiner

METHOD AND DEVICE FOR DETERMINATION OF THE POSITION OF A TERMINAL IN A MOBILE COMMUNICATION NETWORK

CROSS-REFERENCE TO RELATED APPLICATION

The present application is a national phase application of PCT Application No. PCT/EP2007/009107, filed on Oct. 19, 2007, and claims priority to German Application No. 10 2006 056 338.7, filed on Nov. 29, 2006, the entire contents of which are herein incorporated by reference.

BACKGROUND OF THE INVENTION

1. Field of the Invention

The invention relates to a method and a device for improved determination of the position of a user device in a mobile-radio network.

2. Discussion of the Background

The possibility of determining the position of user devices is an important property of modern mobile-radio networks. In this context, user devices can be mobile telephones, but especially also any computers, which are fitted with equipment for transmitting and receiving within a mobile-radio network. Various position-determining methods are available:

In the case of simple cell positioning, the position of the radio cell, onto which a user device is logged, is determined. The accuracy depends upon the size and shape of the radio cells. The smaller the radio cells, the more accurately the actual and the determined position will agree.

With the so-called TDOA method (TDOA=Time Difference of Arrival), the position of a user device in a mobile-radio network is determined on the basis of the difference between the arrival times of a signal transmitted from the user device at a plurality of different receivers. With two receivers in known positions, the possible transmitter positions are disposed on a hyperboloid. If a third receiver is present, the possible positions are disposed on a curve, which is formed from the intersection of two hyperboloids. An accurate position determination requires at least four receivers.

However, one disadvantage of the TDOA method is an inadequate accuracy of positioning, the possible causes of which may be found in the geometry of the receivers and/or the transmitter, in the time measurement of the receiver system, the synchronisation of the receiver systems or in the bandwidth of the transmitted impulses.

The so-called E-OTD method uses the already-existing GSM infrastructure, in order to determine the position of a user device. The position of a user device is determined by triangulation across three base stations, wherein the evaluation is based on the time difference upon the arrival of radio signals at the user device (for example, mobile telephone). These time differences are either transmitted from the user device to the network for position determination, or the user device receives additional data from the network and, from the latter, calculates its position itself. The method also functions inside buildings, but, with deviations up to 100 metres from the actual position, does not achieve the accuracy of GPS. Furthermore, user devices must be specially adapted for E-OTD.

One method with relatively high accuracy is the so-called AGPS method (Assisted GPS). This is a method for the transfer of provisional data via a mobile-radio network for a faster GPS positioning. With reference to the radio cell, which the mobile telephone uses, the approximate location of the mobile telephone is already known. This position can be determined more accurately through measurements of the signal delay times from the other mobile-radio masts disposed in the vicinity. Reception by at least three base stations is required in order to calculate the location accurately. If only two base stations are received, the location can be limited only to two positions.

This information can be used to narrow the search range for the satellite signals (identity of the visible satellites, approximate delay time, Doppler shift) and accordingly to accelerate the measurement.

With conventional GPS, the receiver has two tasks. It measures the arrival time of the signals and reads the data transmitted from the satellites, which contain, inter alia, path parameters and error corrections. In the case of A-GPS, the satellite data are read by reference receivers, which are set up in a stationary manner with good visibility with regard to the sky. Their exact position data have already been measured. Accordingly, the mobile receiver need only measure the arrival times of the satellite signals, which requires a level up to 30 dB lower.

Dependent upon the location, at which the actual calculation of the position is implemented, a distinction is made between network-based and terminal-based mode. In the case of the network-based A-GPS, a user device transmits the measured signal delay times of the respective satellite signals, and a server in the mobile-radio network calculates from these the exact position, which is finally transmitted back to the user device. In this case, the provisional data consist exclusively of the search-field parameters. In the case of the terminal-based mode, the user device receives only the satellite data and auxiliary data and calculates its position itself after the measurement.

One disadvantage of the A-GPS method is that it requires a receiver for the signal of the GPS satellites in the mobile user device, which generates additional costs. A further disadvantage is that, inside buildings, the GPS signals can be received only very poorly or not at all.

SUMMARY OF THE INVENTION

Embodiments of the present invention advantageously provide a method and a system for the positioning of user devices in a mobile-radio network, which allows a relatively-accurate positioning even if only a relatively-inaccurate positioning method is available for the user device alone. In particular, embodiments of the present invention allow the accurate position determination of user devices inside a building, in which, for example, the use of AGPS is not possible.

In one embodiment of the invention, the method for determining the absolute position of a first user device in a mobile-radio network comprises the determination of an absolute position of a second user device with a first position-determining method; the determination of a relative position of the first user device with a second position-determining method; and the determination of the absolute position of the first user device on the basis of the absolute position of the second user device and the relative position of the user device relative to the second user device. The first and the second position-determining method are different methods.

The determination of the relative position of the first user device relative to the second user device can, in a further embodiment, comprise: the determination of a first, absolute provisional position of the first user device with the second position-determining method; the determination of a second, absolute provisional position of the second user device with the second position-determining method; and the determination of the relative position on the basis of the first, absolute provisional position of the first user device and the second, absolute provisional position of the second user device.

In a further embodiment, the first position-determining method can allow a more precise determination of the absolute position than the second position-determining method. The AGPS method can be used as the first position-determining method. The TDOA method can be used as the second position-determining method.

In a further embodiment, the method for determining the absolute position of a user device in a mobile-radio network can also comprise checking whether the absolute position of the user device can be determined with a first method. If yes, the absolute position of the user device can be determined with the first position-determining method. The method can be repeated periodically. Furthermore, the method can also be implemented exclusively upon request.

In a further embodiment, a method for determining the position of a user device in a mobile-radio network can furthermore comprise the implementation of the above stages for determining a plurality (n) of positions of the user device for a plurality (n) of second user devices and the determination of the position of the user device upon the basis of the plurality (n) of positions.

The system for determining the absolute position of a user device in a mobile-radio network can comprise means for determining an absolute position of a second user device with a first position-determining method; means for determining a relative position of the first user device relative to the second user device with a second position-determining method; and means for determining the absolute position of the first user device on the basis of the absolute position of the second user device and the relative position of the user device relative to the second user device, wherein the first and the second position-determining methods are different methods.

BRIEF DESCRIPTION OF THE DRAWINGS

These and further aspects, properties and advantages of the present invention are presented in the following detailed description of exemplary embodiments, with reference to the attached drawings. The drawings are as follows.

DETAILED DESCRIPTION OF EXEMPLARY EMBODIMENTS OF THE INVENTION

Figure 1:
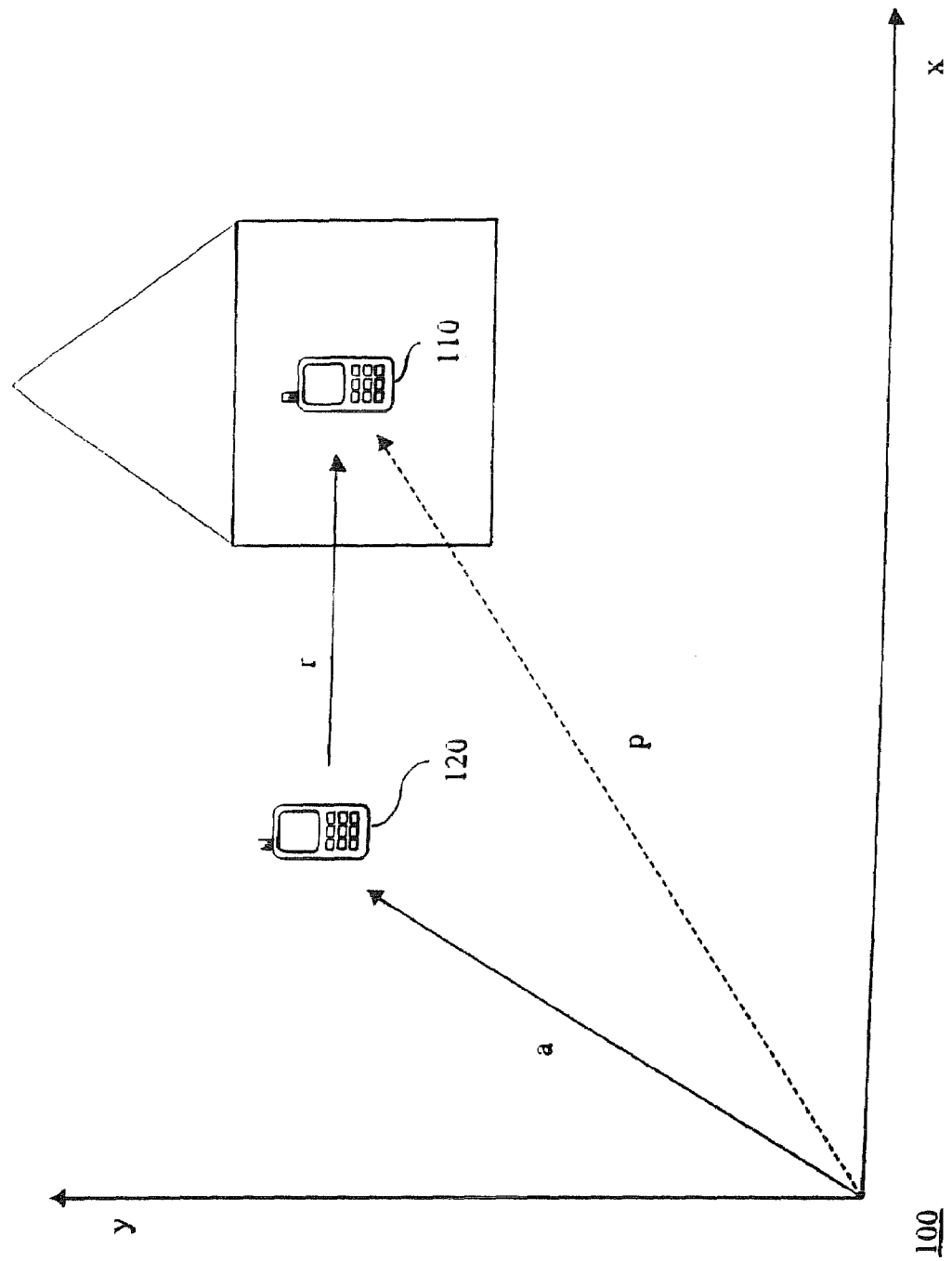
FIG. 1 shows the schematic presentation of a situation, in which a method according to one embodiment of the invention can be used.

FIG. 1 provides a schematic presentation of a situation, in which a user device 110 is disposed inside a building. The building shields the user device 110 in such a manner that signals of a satellite navigation system can only be received inadequately or not at all by the user device 110. By contrast, the adjacent user device 120 is not shielded, so that, for its part, the latter can use signals of the satellite navigation system for position determination.

Now, the essential idea of the invention is to incorporate the positioning of the adjacent user device 120 in the position determination of the user device 110, in order, in this manner, to increase the accuracy of the position determination of the user device 110.

Figure 2:
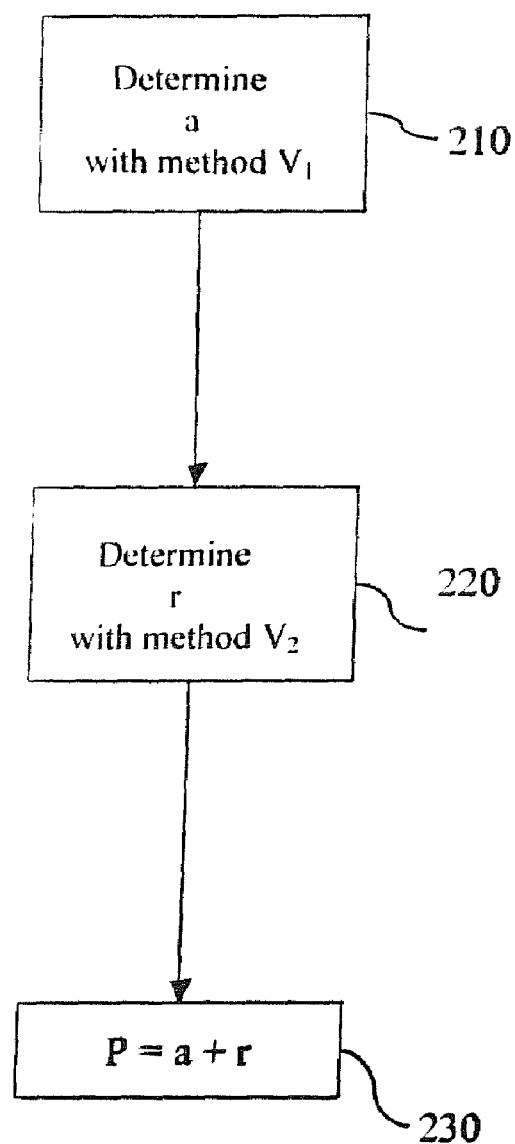
FIG. 2 shows a flow chart of a method according to one embodiment of the invention.

FIG. 2 shows a flow chart of a method 200 for determining the absolute position of a user device in a mobile-radio network according to an embodiment of the invention. Let us assume a situation as was described in connection with FIG. 1.

In stage 210, a first absolute position of the user device 120 is measured with a first position-determining method. The first position-determining method can be based upon a satellite navigation system. It is assumed that the user device 120 is capable of receiving signals of the satellite navigation system and processing them to provide a position determination. The GPS system can be used as the satellite navigation system. As an alternative, the GALILEO system or a hybrid system can be used. The first position-determining method can be the so-called AGPS method (Assisted-GPS, cf. introduction).

In stage 220, a relative position of the first user device relative to the second user device is determined with a second position-determining method. In this context, in one embodiment of the invention, a vector can be determined, which indicates the position of the second user device relative to the position of the first user device as a coordinate origin, in each case measured with the second position-determining method. It is assumed that the second position-determining method can be implemented both for the first and also for the second user device, regardless of the fact that the first user device is disposed inside a building. In one embodiment of the invention, the second position-determining method provides a reduced precision by comparison with the first position-determining method. The TDOA method can be used as the second position-determining method.

In stage 230, the absolute position of the first user device is determined on the basis of the absolute position of the second user device and the relative position of the first user device relative to the second user device.

In one embodiment of the invention, the relative position of the first user device relative to the second user device can be determined by determining a first, absolute provisional position of the first user device and a second absolute provisional position of the second user device with the second position-determining method. The relative position of the first user device relative to the second user device is then obtained as the difference between the two provisional positions. The absolute position of the first user device can then be determined as the sum of the absolute position of the second user device and of the relative position. In vector formulation:

$$\vec{a} = \vec{p} + (\vec{r}_2 - \vec{r}_1)$$

Further embodiments of the invention contain a repetition of the position determination according to stages 210 to 230 at regular timing intervals or the implementation of stages 210 to 230 only on the basis of a specific request.

Figure 3:
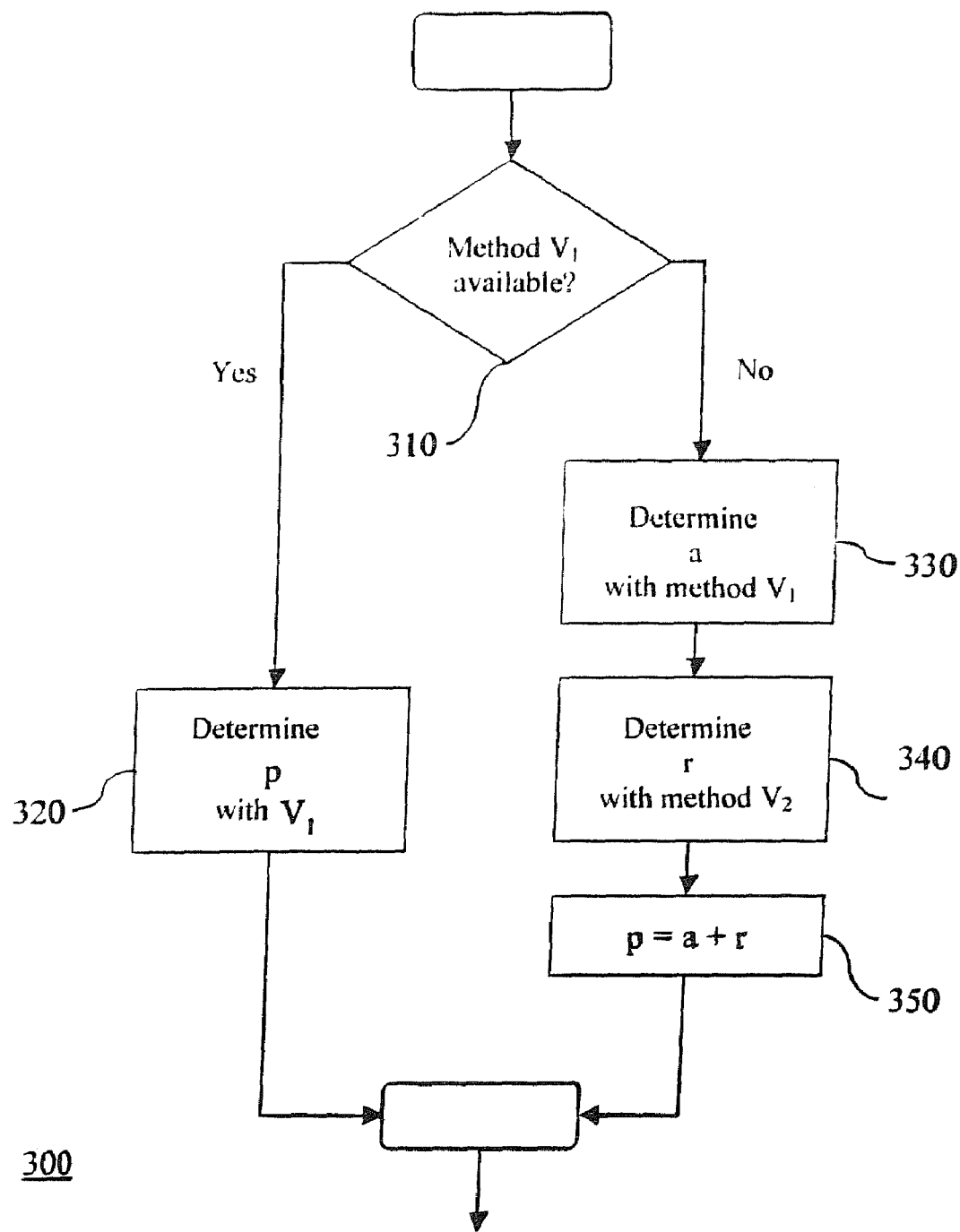
FIG. 3 shows a flow chart of a method according to a further embodiment of the invention.

FIG. 3 shows a flow chart for a method for determining the absolute position of a user device in a mobile-radio network according to a further embodiment of the invention. It is assumed that the first position-determining method operates more accurately than the second position-determining method. It is only necessary to make use of the method described in the context of FIG. 2 if a better option for position determination for the user device 110 in question cannot be found.

Accordingly, in stage 310, before the use of the first and second position-determining method, a test is implemented to determine whether the first position-determining method is available for determining the position of the user device 110. If this is the case, the first position-determining method is used in stage 320, in order to determine the position of the user device 110.

Only if the first position-determining method is not available for the user device 110, is the method described in connection with FIG. 2 used in stages 330, 340 and 350. This procedure has the advantage that the implementation of a more costly method is saved, if an accurate positioning can also be implemented by another means.

Figure 4:
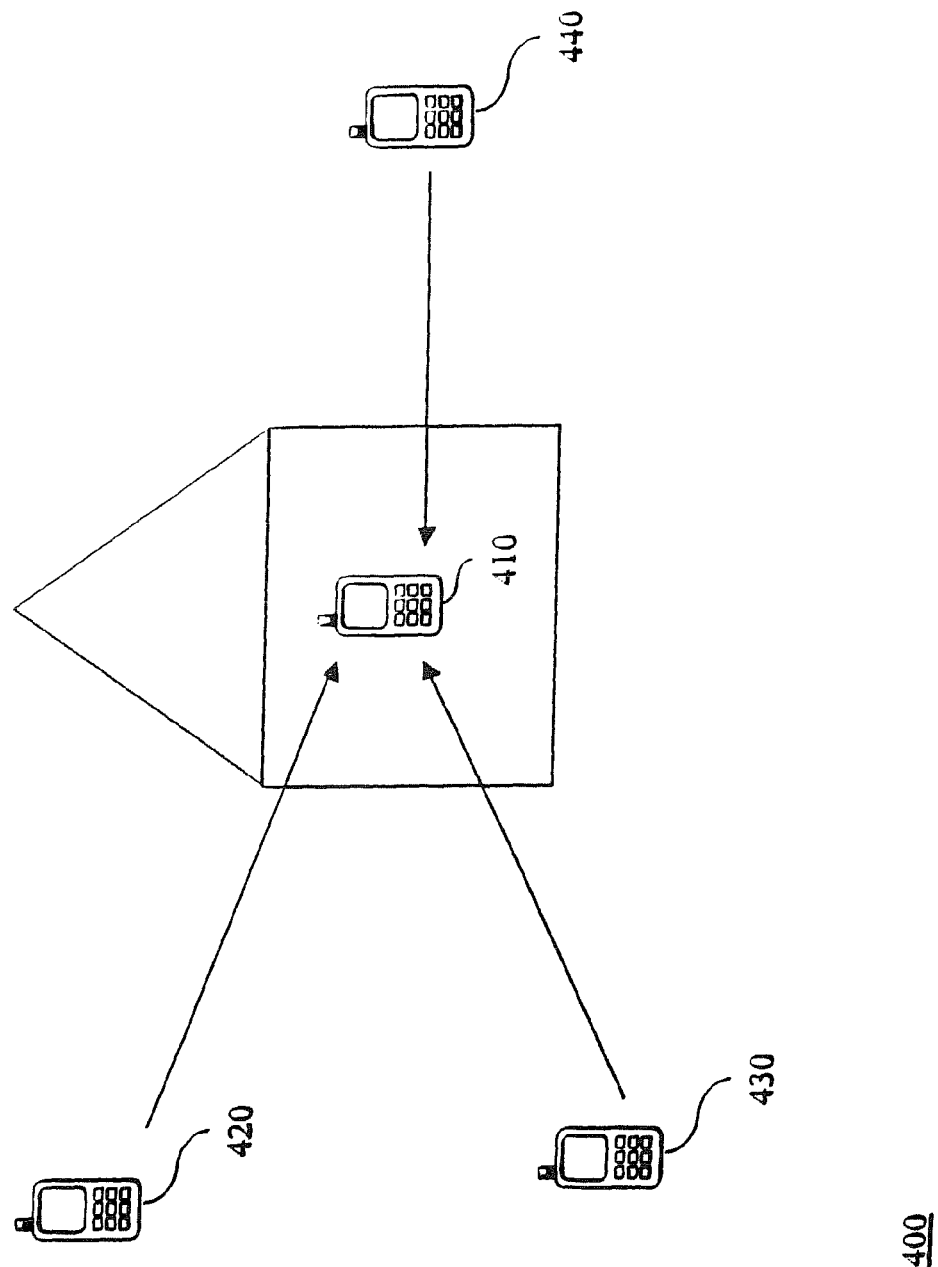
FIG. 4 shows a schematic presentation of a situation with several adjacent devices, in which, in a method according to a further embodiment of the invention can be used.

FIG. 4 provides a presentation of a further situation, in which a user device 410 is disposed inside a building in a similar manner to the situation in FIG. 1, wherein several second user devices 420, 430 and 440 are now available for a position determination according to the invention.

The following section describes how the method presented in connection with FIG. 2 can be further improved in the situation shown in FIG. 4. In this context, it is again assumed that the first position-determining method is not available for the user device 410 itself, but only the second method.

Figure 5:
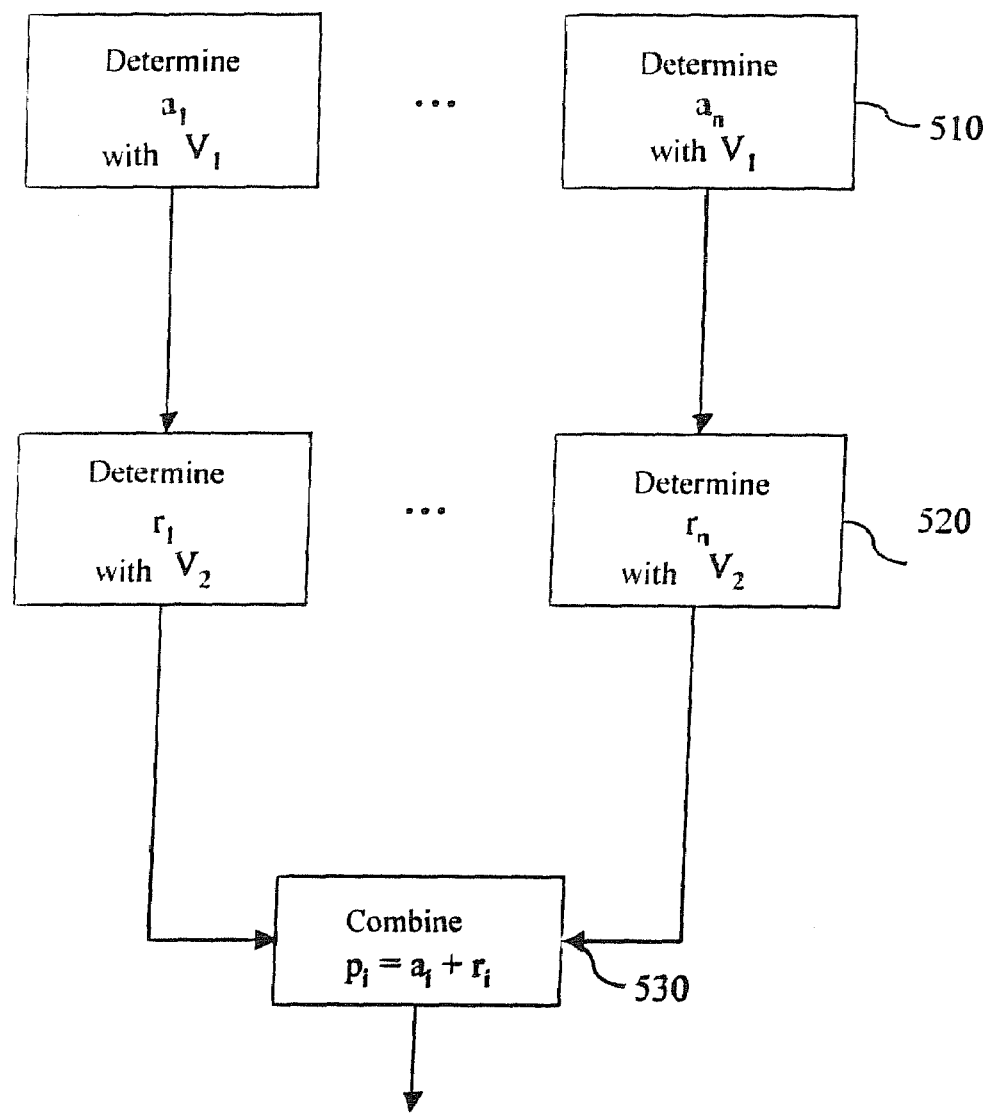
FIG. 5 shows a flow chart of a method according to a further embodiment of the invention.

FIG. 5 shows a flow chart for a method for determining the absolute position of a user device in a mobile-radio network according to a further embodiment of the invention, in which the presence of several adjacent, second user devices is taken into consideration. Let the number of adjacent second user devices in the following paragraphs be n.

In stage 510, absolute positions $a_i$, wherein i=1,...,n, are determined with the first position-determining method for every adjacent, second user device 520, 530 etc. In stage 520, relative positions $r_i$ of the first user device 510 relative to the respective second user devices are determined for every adjacent second user device 520, 530, etc. with the second position-determining method.

In stage 530, n positions $p_i$ of the user device 510, some of which may be identical, but some may also be different, are obtained from the combined absolute and relative positions $a_i$ and $r_i$ according to the formula indicated in connection with FIG. 2. The determination of the final position p can be implemented by selection and/or combination of the $p_i$.

For example, the position, which minimizes the sum of the square distances from the individual $p_i$, can be determined as the final position p:

$$p = \min_p \sum_{i=1}^{n} (p_i - p)^2$$

The invention presented has the advantage that the position of a user device in a mobile-radio system is made possible, even if only a relatively-inaccurate positioning method is available for the user device. One particular advantage of the present invention is the accurate position determination of user devices inside a building, in which, for example, the use of AGPS is not possible.

The invention claimed is:

1. A method for determining an absolute position of a first mobile user device in a mobile-radio network, comprising:
   determining an absolute position of a second mobile user device with a first position-determining method wherein a first vector is determined indicating the absolute position of the second mobile user device relative to a first coordinate origin;
   determining a relative position of the first mobile user device relative to the second mobile user device with a second position-determining method, wherein a second vector is determined which indicates a position of the second mobile user device relative to the position of the first mobile user device as a second coordinate origin; and
   determining the absolute position of the first mobile user device on the basis of the absolute position of the second mobile user device and the relative position of the first mobile user device relative to the second mobile user device, wherein said determining the absolute position of the first mobile user device involves an addition of the first and the second vectors,
   wherein the first and the second position-determining methods are different methods.

2. The method according to claim 1, wherein the determination of the relative position of the first mobile user device relative to the second mobile user device comprises:
   determining a first, absolute provisional position of the first mobile user device with the second position-determining method;
   determining a second, absolute provisional position of the second mobile user device with the second position-determining method; and
   determining the relative position on the basis of the first absolute provisional position of the first mobile user device and of the second absolute provisional position of the second mobile user device.

3. The method according to claim 2, wherein the first position-determining method allows a more precise determination of the absolute position than the second position-determining method.

4. The method according to claim 3, wherein the first position-determining method comprises an assisted global positioning system (AGPS) method.

5. The method according to claim 4, wherein the second position-determining method comprises a time difference of arrival (TDOA) method.

6. The method according to claim 3, wherein the second position-determining method comprises a time difference of arrival (TDOA) method.

7. The method according to claim 1, wherein the first position-determining method allows a more precise determination of the absolute position than the second position-determining method for the relative position of the first mobile user device relative to the second mobile user device.

8. The method according to claim 7, wherein the first position-determining method comprises an assisted global positioning system (AGPS) method.

9. The method according to claim 8, wherein the second position-determining method comprises a time difference of arrival (TDOA) method.

10. The method according to claim 7, wherein the second position-determining method comprises a time difference of arrival (TDOA) method.

11. A method for determining an absolute position of a mobile user device in a mobile-radio network, comprising:
    determining that the absolute position of the mobile user device cannot accurately be determined with a first method; and
    determining the absolute position of the mobile user device with a method according to claim 1.

12. The method according to claim 11, wherein the method is repeated periodically.

13. The method according to claim 11, wherein the method is implemented only upon request.

14. The method according to claim 1, wherein the method is repeated periodically.

15. The method according to claim 1, wherein the method is implemented only upon request.

16. A method for determining a position of a first mobile user device in a mobile-radio network, said method comprising:
   using the method according to claim 1 for determining a plurality of positions of the first mobile user device for a plurality of second mobile user devices; and
   determining the position of the first mobile user device, on the basis of the plurality of positions of the second mobile user devices.

17. The method according to claim 16, wherein the determination of the position of the first mobile user device on the basis of the plurality of positions of the second mobile user devices involves a plurality of summations to determine a plurality of position vectors and further involves determining a combined vector on the basis of said plurality of position vectors.

18. A method according to claim 17, wherein the determining of the combined vector involves a minimization.

19. A non-transitory computer-readable storage medium carrying software for determining an absolute position of a mobile user device in a mobile-radio network, which, when executed by one or more processors, cause an apparatus to at least perform the method steps according to claim 1.

20. The method according to claim 1, wherein the method for determining the absolute position of the first mobile user device is performed upon request and/or is repeated periodically.

21. A system for determining an absolute position of a first mobile user device in a mobile-radio network, comprising:
   means for determining an absolute position of a second mobile user device with a first position-determining method wherein a first vector is determined indicating the absolute position of the second mobile user device relative to a first coordinate origin;
   means for determining a relative position of the first mobile user device relative to the second mobile user device with a second position-determining method, wherein a second vector is determined which indicates a position of the second mobile user device relative to the position of the first mobile user device as a coordinate origin;
   means for determining the absolute position of the first mobile user device on the basis of the absolute position of the second mobile user device and of the relative position of the first mobile user device relative to the second mobile user device, wherein said determining the absolute position of the first mobile user device involves an addition of the first and the second vectors, and
   wherein the first and the second position-determining methods are different methods.

22. The system according to claim 21, wherein the system performs the determination of the absolute position of the first mobile user device upon request and/or repeats the determination periodically.

* * * * *